United States Patent [19]

Kundrat

[11] Patent Number: 5,567,224
[45] Date of Patent: Oct. 22, 1996

[54] METHOD OF REDUCING METAL OXIDE IN A ROTARY HEARTH FURNACE HEATED BY AN OXIDIZING FLAME

[75] Inventor: David M. Kundrat, Cincinnati, Ohio

[73] Assignee: Armco Inc., Middletown, Ohio

[21] Appl. No.: 470,311

[22] Filed: Jun. 6, 1995

[51] Int. Cl.$^6$ ................................................. C21B 13/14
[52] U.S. Cl. ......................... 75/414; 75/484; 75/542; 75/543; 75/544; 420/71
[58] Field of Search ........................ 75/414, 484, 623, 75/629, 961; 420/71

[56] References Cited

U.S. PATENT DOCUMENTS

| | | |
|---|---|---|
| 2,069,469 | 2/1937 | Andersen ........................ 266/183 |
| 3,443,931 | 5/1969 | Beggs et al. . |
| 4,622,905 | 11/1986 | MacDougall . |
| 4,701,214 | 10/1987 | Kaneko . |
| 4,772,316 | 9/1988 | Radke et al. . |
| 4,971,622 | 11/1990 | Slatter . |
| 5,039,480 | 8/1991 | Tanabe et al. . |
| 5,047,082 | 9/1991 | Tanabe et al. . |
| 5,186,741 | 2/1993 | Kotraba et al. . |

Primary Examiner—Melvyn Andrews
Attorney, Agent, or Firm—R. J. Bunyard; L. A. Fillnow; R. H. Johnson

[57] ABSTRACT

Method of reducing metal oxide in a rotary hearth furnace (14) to make a feed stock for a refining vessel when manufacturing alloyed iron, alloyed steel or stainless steel. The rotary hearth furnace includes an annular inner refractory wall (32), an annular outer refractory wall (34), an annular refractory platform (33) between the two walls. Stationary fuel burners (36, 40) are mounted to walls (32, 34) at a position just above an upper surface of the platform. A mixture of a metal oxide and a carbonaceous reductant is placed onto the upper surface of the platform and rotated past the burners. The oxide is heated by an oxidizing flame. Thereafter, a second layer of a reductant is charged over the hot first layer, and both layers are heated for an additional period of time to a temperature of at least 1300° C. to reduce the metal oxide. The metal oxide may be chromium ore, chromium ore concentrate, nickel ore, nickel ore concentrate and stainless steel flue dust. The reductant may be coal or coke. The reduced metals provide inexpensive metal units for alloying with molten iron.

20 Claims, 2 Drawing Sheets

METHOD OF REDUCING METAL OXIDE IN A ROTARY HEARTH FURNACE HEATED BY AN OXIDIZING FLAME

BACKGROUND OF THE INVENTION

The invention relates to a method of reducing an oxygen-bound metal in a furnace heated with an oxidizing flame. More particularly, a first layer, including a mixture of a metal oxide and a reductant, are placed onto an annular platform within the furnace. The first layer is covered by a reductant second layer to prevent reoxidation of the reduced metal oxide. The reduced metal oxide may be used as feed stock for supplying metal units into a refining furnace for alloying with molten iron.

It is known to reduce metal oxides and metal ores with the reduced product being subsequently used as a feed stock in a refining vessel for making iron or iron alloys. The type of furnaces commonly used for reducing metal ores are vertical shaft, rotary kiln or rotary hearth. U.S. Pat. No. 4,701,214, incorporated herein by reference, discloses using a rotary hearth furnace wherein iron ore, coal and lime are mixed together, pulverized and compacted into pellets. The iron ore pellets are fed two to three pellets deep onto a rotating platform within the furnace. The iron ore pellets are heated to 1000° C. by burners positioned annularly above the rotating platform. A reducing fuel of hydrogen and carbon monoxide is used in the burners. After being reduced, the iron ore pellets then are fed into a smelting furnace to be dissolved into molten iron.

U.S. Pat. No. 4,622,905 discloses using a rotary hearth furnace to metallize iron oxide. Pellets of iron oxide and coal powder are placed onto a rotating platform within the furnace. The pellets are heated by a luminous flame from burners positioned annularly above the rotating platform. The heating flame is formed from the combustion of powdered coal and oxygen.

U.S. Pat. No. 5,166,741 discloses using a rotary hearth furnace to metallize iron oxide steel plant dusts containing heavy metals. Pellets of iron oxide, carbonaceous material, a binder and optionally calcium oxide are formed into pellets. The pellets are placed onto a turntable in the rotary hearth furnace. The pellets are dried at a temperature no higher than 900° C. for up to 15 minutes and then reduced for up to 30 minutes at a temperature of 1150° C.

U.S. Pat. No. 3,443,931 discloses using a rotary hearth furnace to metallize iron oxide. Pellets of iron oxide and coal are laid one or two pellets deep onto a rotating platform within the furnace. The pellets are heated in an atmosphere devoid of free oxygen having a temperature up to about 1425° C. by burners positioned above the rotating platform.

U.S. Pat. No. 4,772,316 discloses using a rotary-type furnace to metallize an iron-containing chromium ore to produce ferrochromium used as a master alloy in the manufacturing of chrome steel. A mixture of chromite ore, coal and a flux is heated in a carbon monoxide-containing atmosphere. The mixture is charged into one end of the furnace, flows through the furnace and is continuously discharged from the other end of the furnace. Burner gases are passed through the discharge end of the furnace and flow in a direction counter to the flow of the chromium ore. Coal is used, not only to reduce the combustion product gases of $CO_2$ and $H_2O$ to form carbon monoxide and hydrogen, but also to prevent reoxidation of metallized chromium.

U.S. Pat. No. 4,971,622 relates to reducing and desulfurizing chromite ore. A chromite ore is mixed with a carbonaceous material and heated to 1500° C. in a rotary kiln. At least 90 wt. % of the chromium oxide is reduced to a metallic state, and nearly 100 wt. % of the iron oxide is reduced to a metallic state. This reduction product containing calcium oxide and excessive carbon is fed into an electric arc furnace for desulfurization.

It also is known to produce stainless steel by charging chromite ore and/or nickel ore directly into a refining vessel having a top blowing oxygen lance and bottom tuyeres for blowing stirring gas. U.S. Pat. No. 5,047,082 discloses producing stainless steel in an oxygen converter using a low-sulfur nickel ore instead of ferronickel. Nickel ore is reduced by carbon dissolved in molten iron and char present in the slag. U.S. Pat. No. 5,039,480 discloses producing stainless steel in a converter by sequentially smelting and reducing low-sulfur nickel ore and then chromite ore instead of melting ferronickel and ferrochromium. The ores are reduced by carbon dissolved in the molten iron and char present in the slag.

There are disadvantages associated with processing ores in a shaft furnace or a rotary kiln. In a shaft furnace, the ore burden travels downwardly through the shaft toward hot reducing gases rising counter-current through the bed or column of ore. The ore burden does not mix with itself to any great extent during its decent through the shaft. In a kiln, as the ore moves from one end to the other by gravity, there is considerable mixing due to rotation of the kiln. Both furnaces involve movement of the ore relative to the furnace walls, making it more difficult to know and control the temperature of the ore. A shaft furnace and a rotary kiln tend to have sticking or clustering problems. In the shaft furnace, the ore tends to stick to itself, while in the kiln furnace the ore tends to stick to the inside wall of the drum as well as to itself. And, these problems increase, the higher the operating temperatures. Occasionally during operation, a kiln will develop local hot spots where melting of the ore can occur, resulting in severe agglomeration of the ore, which adversely affects production. Both the shaft and kiln furnaces require lump or hardened agglomerated ore because of burden weight in the shaft and impact in the kiln.

A major disadvantage associated with complete processing of ores in a refining vessel during the manufacture of stainless steel is that the ore usually contains the metal in small amounts and is difficult to melt. Also, generally considerable energy is required to reduce the metal oxide into a metal suitable for alloying. Resort is made to a high degree of post combustion, but this necessitates the addition of solid carbonaceous material to the bath. This carbonaceous material is needed to prevent foaming of the bath slag and to prevent reoxidation of the alloys to the slag. The presence of carbonaceous material in the slag in significant quantities results in an enriched carbon concentration of the bath. This carbon has to be removed during refining. Smelting of ore may be further undesirable, especially in the case of low-grade ores such nickel ore, because as much as 80 per cent of the weight of the ore converts to slag. Nickel ores contain only about 1–3 wt. % Ni.

Nevertheless, there remains a long felt need to provide inexpensive metal units for making alloyed iron or steel such as chromium alloyed steel or stainless steel. There also remains a need for providing metal units from inexpensive metal oxides. Other long felt needs include developing a reliable and consistent process for providing inexpensive Cr and/or Ni units for alloying.

BRIEF SUMMARY OF THE INVENTION

A principal object of the invention is to produce inexpensive alloying metals from a metal oxide for feeding into a refining vessel containing molten iron.

Another object of the invention is to reduce metal oxide in a furnace heated with an oxidizing flame.

Another object of the invention is to reduce metal oxide by contact with a carbonaceous reductant on heating with an oxidizing flame to produce valuable alloying metals for producing stainless steel.

Another object of the invention includes prevention of reoxidation of metal reduced from a metal oxide in a furnace heated with an oxidizing flame.

An additional object of the invention includes providing inexpensive Cr and Ni units reduced from metal oxides and sulfides to be used as feed stock to an electric furnace and/or a refining vessel during the manufacture of alloyed steel.

The invention relates to a method of reducing oxygen-bound metal in a furnace heated with an oxidizing flame and includes providing the furnace with an annular platform and at least one fuel burner, placing a first layer of a mixture of an oxygen-bound metal and a reductant onto an upper surface of the platform, rotating the platform past the burner to heat the first layer by an oxidizing flame, charging a second layer of a reductant covering the first layer, continue heating the metal oxide to sufficient temperature and for sufficient time to reduce at least partially the metal oxide, whereby the second layer prevents reoxidation of the partially reduced metal by oxidizing gases in the furnace.

Another feature of the invention is for the aforesaid first layer being heated to at least 1000° C. before being covered with the second layer.

Another feature of the invention is for the aforesaid mixture to include at least 10 wt. % fixed carbon.

Another feature of the invention is for the aforesaid mixture to include pulverized chromite ore and pulverized coal.

Another feature of the invention is for the aforesaid partially reduced oxygen-bound chromium in the mixture to be at least 40 % metallized to chromium or chromium carbide.

Another feature of the invention is for the aforesaid first layer being no more than 40 mm deep.

Another feature of the invention is for the aforesaid second layer being no more than 10 mm deep.

Another feature of the invention is for the aforesaid mixture to additionally include pulverized sulfur-bearing nickel concentrate.

Another feature of the invention is for the aforesaid partially reduced mixture to contain at least 0.1 wt. % nickel as metal or as nickel sulfide.

Another feature of the invention is for the aforesaid first layer being maintained at a temperature of at least 1300° C. for at least 30 minutes.

Advantages of the invention include an economical process for producing valuable metals that can be used for alloying molten iron, partially reducing a metal oxide in less than 30 minutes, achieving at least 40% chromium metallization and 70% iron metallization by heating in a furnace with an oxidizing flame, partially reducing a metal oxide agglomerate without requiring the agglomerate to have high strength and prevention of reoxidation of the reduced metal oxide while in the rotary hearth furnace.

The above and other objects, features and advantages of the invention will become apparent upon consideration of the detailed description and appended drawing.

DETAILED DESCRIPTION OF THE PREFERRED EMBODIMENT

Figure 1:
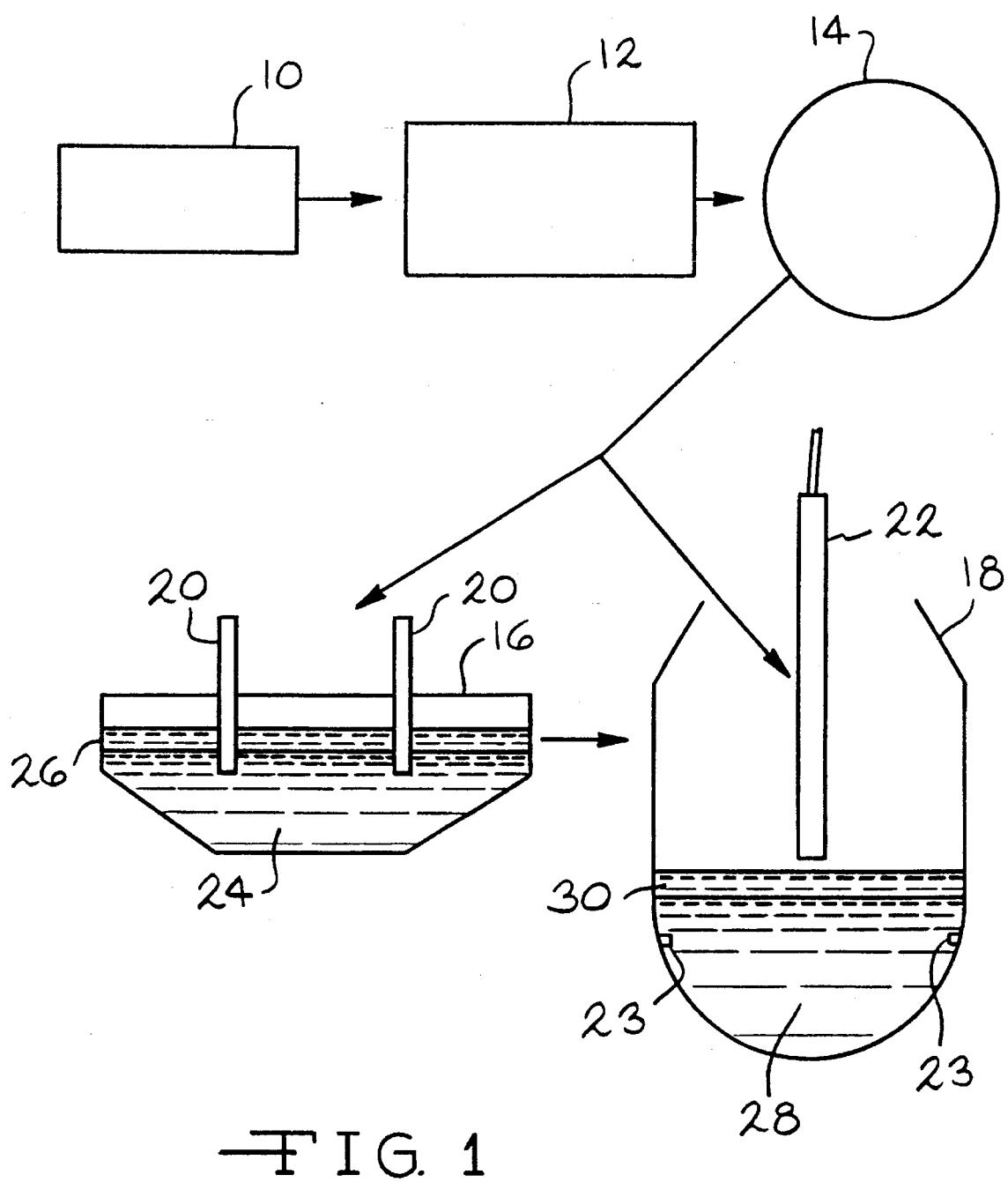
FIG. 1 is a schematic illustrating one embodiment of the process of the invention.

The invention relates to a method of reducing at least partially an oxygen-bound metal to a metal in a furnace heated with an oxidizing flame. An essential feature of this invention includes protecting the metal with a covering or blanket of a carbonaceous material to prevent reoxidation while exposed to the oxidizing flame. Another important feature of the invention includes the heating furnace having a platform adapted for rotation while supporting the oxygen-bound metal.

The invention includes providing a furnace, heated by an oxidizing flame, having an annular platform and at least one fuel burner adapted for mounting at a position above the platform. A first layer of a mixture of an oxygen-bound metal, i.e., metal oxide, and a reductant are placed onto an upper surface of the platform. The metal oxide and reductant may be in the form of dust, agglomerate, sinter, compacts, pellets or a mixture thereof. After the mixture passes through a heating zone and is heated to at least about 1000° C., preferably to at least 1100° C., more preferably to at least 1200° C., a second layer of a carbonaceous reductant is placed over the first layer. Although the second layer could be placed over the first layer prior to the first layer being heated, it is desirable to delay charging the second layer until after the first layer approaches the metallization temperature. If the second layer is charged before insufficient heating of the first layer, the second layer can be insulating, causing inefficient heating by the rotary furnace. On delaying charging of the second layer, the heating times required to bring the metal oxide to metallization temperature and to reduce the oxide are minimized. The platform is continuously rotated at a controlled speed past the burner, wherein the mixture remains stationary upon the upper surface of the platform. The mixture is heated by radiation from an oxidizing flame emanating from the burner to sufficient temperature and for sufficient time to reduce in the first layer at least partially the metal oxide to a metal and/or a carbide, with excess carbon remaining. The second layer prevents reoxidation of the partially reduced metal oxide by oxidizing gases emanating from the flame until the reduced metal oxide is removed from the furnace. The partially reduced mixture may be used as feed stock for alloying with molten iron in a melting furnace or a refining vessel. The reason for heating the furnace with an oxidizing flame rather than a reducing flame is because a higher temperature can be more efficiently attained from an oxidizing flame.

Oxygen-bound metal of the invention is defined to include any one of several oxide ores or concentrates formed from nickel ores such as low-sulfur laterite or garnierite, chromite ores or concentrates, iron ores, pulverized metal ores, stainless steel flue dust and mixtures thereof.

Oxygen-bound chromium is especially desirable and is present in chromite ore or concentrate in the form of spinel with other oxides, or in stainless steel flue dust as $CrO_z$, $z=1.0$, $1.5$ and/or $3$. The chromite spinel can be represented stoichiometrically as $(Mg,Fe)(Cr,Al,Fe)_2O_4$, where the ratio of $Mg^{++}$ to $Fe^{++}$ and the relative proportions of $Cr^{+3}$, $Al^{+3}$ and $Fe^{+3}$ to each other are variable, depending on the ore source. Generally, the ratio of total Cr to total Fe (Fe$^{+++}$+Fe$^{++}$) ranges from about 1 to 3, depending on the ore source.

During reduction of the chromite spinel with carbon, small amounts of the metals Fe and Cr first precipitate, forming the carbides Fe$_3$C and (Fe,Cr)$_3$C on contact with carbon. Initial reduction of the ferrous ions is generally faster than that of the ferric ions, resulting in a low initial ratio of Cr/Fe in the precipitating metal. As the ratio of Cr/Fe in the reduced metal increases with time, the metal reacts with excess carbon to form the carbide (Cr, Fe)$_7$C$_3$, in accordance with the dictates of the Fe—Cr—C phase diagram. During the reaction, the oxide MgAl$_2$O$_4$ present initially in the spinel remains in the same oxidation state.

In the case of reduction of chromite, % chromium metallization and % iron metallization can be understood in terms of the ratio of oxygen removed to total oxygen in oxygen-bound chromium and the ratio of oxygen removed to total oxygen in the oxygen-bound iron, respectively. The portion of the chromite spinel participating in the metallization process may be represented by the stoichiometric formula FeO(CrFe$_w$)O$_3$, where w is the ratio of Fe$^{+++}$ to Cr$^{+++}$. The metallization process may be represented by the reaction:

$$FeO(CrFe_w)O_3+(x+y)C=FeO_{1-x}(CrFe_w)O_{3-y}+(x+y)CO,$$

where x and y represent the ratios of removed oxygen to reducible ferrous (Fe$^{++}$) and to the reducible ferric ions (Cr$^{+++}$ and Fe$^{+++}$), respectively. Before reduction begins at 0% metallization, x=y=0; at 100% metallization x=1 and y=3. Pct chromium metallization is defined as the total oxygen-free chromium relative to the total chromium; and, % iron metallization is defined as the total oxygen-free iron relative to the total iron in the chromite, all species determined by chemical analyses. By oxygen-free is meant the metals Cr and Fe as well as Cr and Fe combined as a carbide by the following reactions between the precipitating metal and carbon in excess of that required for the metallization process:

$$3(Fe, Cr)+C=(Fe, Cr)_3C$$

$$7(Cr, Fe)+3C=(Cr,Fe)_7C_3$$

High sulfur-bearing nickel oxide concentrates that may be added to the chromite-carbon mixture in the invention include those having a ratio of S/Ni less than 1.0, Cu/Ni and Co/Ni less than 0.1 and the balance being iron oxide and residual amounts of MgO, Si$_2$O$_3$, Al$_2$O$_3$, and CaO.

If the metal oxide is nickel laterite ore or concentrate from this ore, nickel oxide generally will be hydrated in the form of (Fe,Ni)OOH. Upon contact with carbon at an elevated temperature, the $^-$OH would be liberated as hydrogen and carbon monoxide. The remaining nickel oxide (NiO) and iron oxide (FeO) would be partially reduced to metallic Ni and Fe. In the case of nickel laterite undergoing reduction, % nickel metallization is defined as the total oxygen-free nickel relative to the total nickel, according to the following reaction:

$$(FeNi_p)OOH+2C=1/(1+p)Fe+p/(1+p)Ni+2CO+\tfrac{1}{2}H_2,$$

where p is the ratio of Ni to Fe in nickel laterite.

If the origin of the metal oxide is flue dust, the oxide may be in the form of MeO$_y$ (where y=1, 1.5 or 3 for Me=Cr; y=1 for Me=Ni and y=1.05, 1.33 or 1.5 for Me=Fe), which all partially reduce directly to metal and possibly a metal carbide. For example, in the case of a stainless steel flue dust, chromium oxide may be in the form of CrO, Cr$_2$O$_3$ or CrO$_3$. The dust would be reduced by carbon directly to metallic Cr and Fe, (Fe,Cr)$_3$C and (Cr, Fe)$_7$C$_3$. The extent of the carbide formation depends principally upon the Cr/Fe ratio and the amount of carbon present in the dust.

By stainless steel flue dust is meant to include dust, fines or sludge from stainless steel manufacturing furnaces such as electric arc furnaces and refining vessels. If the metal oxide is in the form of lump ore, the ore preferably would be pulverized and then agglomerated either into pellets, sinter, compacts and the like. The dust preferably would be similarly agglomerated. Preferably, the reductant would be pulverized as well and blended with the pulverized ore or dust prior to agglomeration to increase the rate of reduction by the carbon during heating in the rotary furnace. Suitable carbonaceous reductants include coke, coke breeze, petroleum coke, charcoal, graphite, and low and medium volatile bituminous coals. The metal oxide is at least partially reduced in a rotary hearth furnace and may be further reduced in a vessel for manufacturing ferrous-based material such as Fe—Cr, Fe—Ni, Fe—Cr—Ni, alloyed steel, stainless steel and the like.

An appropriate furnace for use in the invention is a continuous reheating furnace having a circular inner wall circumscribed by a spaced outer wall having space therebetween. The space between the walls includes an annular platform or hearth adapted for rotation relative to the burner. This type furnace is commonly referred to as a rotary hearth furnace, i.e., RHF. The metal oxide to be reduced is usually loaded, dropped or spread to a controlled depth across the width of the hearth by a conveyor or chute. After one complete rotation of the platform, the reduced metal oxide normally is continuously removed by a suitable means such as a discharge screw.

In a preferred embodiment when the metal oxide to be reduced is a chromite ore, it has been determined that at least 40% metallization of the oxygen-bound chromium and 70% metallization of the oxygen-bound iron in the chromite can be achieved by pre-reducing the metal oxide with a carbonaceous reductant prior to final refining in a vessel containing molten iron. The amount of fixed carbon in the carbonaceous reductant mixed with the chromite ore or concentrate should at least equal that stoichiometrically required to reduce theoretically all of the oxygen-bound chromium and iron to 100% metallization. The preferred amount of fixed carbon is 10–25% of the total mixture, more preferably 15–20% and most preferably 20–25%, as higher fixed carbon can ensure a high probability of contact of chromite and carbon grains, which facilitates the reduction kinetics. Together with the % fixed carbon, the metallalization rate depends on grain mesh size, time and temperature. The degree of chromium metallization of 40% can be achieved by pulverizing the chromite ore to a grain size of at least –200 mesh and the reductant to a grain size of at least –200 mesh, by heating the mixture preferably to 1350° C. Preferably, the coal mesh size should be –325. On metallization of the chromium and iron, carbon present in excess of that required for reduction can carburize the metals as they are reduced to (Cr, Fe)$_3$C and (Cr,Fe)$_7$C$_3$ insitu. Because of the complexity of the kinetic processes having different speeds of reaction for oxygen-bound chromium than for oxygen-bound iron, the theoretical maximum metallization will not be reached for each at the same time. Near complete metallization of iron but only a medium metallization of chromium can be achieved for the process to be economical in a reasonable amount of time, on the order of one hour.

The extent of metallization of difficult-to-reduce metal oxides such as chromite ore depends principally upon the reducing temperature of the metal oxide, the time at this temperature, the amount of carbonaceous reductant available for reducing the metal oxide and the grain sizes of the metal oxide and carbon material. For chromite or $CrO_y$ (y=1, 1.5 or 3), the oxygen-bound chromium should be reduced to at least 40% metallization, amounting to at least 5.0 wt. % of the final reduced mixture. To achieve this metallization, the temperature of the chromite should be at least 1350° C. for at least 30 minutes; the % of fixed carbon in the mixture should be 20–25 wt. % and the mesh sizes of the chromite and coal should be at least −200.

The oxygen-bound metals of the mixture of the invention will be at least partially reduced in the RHF. By being partially reduced, it will be understood to mean a portion of the oxygen in chromium-bound and iron-bound oxides in chromite or in steelmaking dust has been removed by carbon as CO leaving metallic chromium, iron and carbides thereof. The other portion of the oxides of the mixture not reduced will remain as chromite, dust, chromium oxide, iron oxide and accompanying oxides of $CaO$, $SiO_2$, $MgO$ and $Al_2O_3$. For example, oxygen-bound chromium in chromite being metallized to the extent of at least 40% is meant 40% or more of the oxygen-bound chromium is reduced to chromium or chromium carbide.

FIG. 1 is a schematic illustrating one embodiment of the process of the invention. Numeral 10 generally refers to a pulverizer which may be utilized for grinding a metal oxide such as an ore into a powder. If pulverized, the metal oxide preferably would be mixed and generally agglomerated, sintered or compacted such as by a pelletizing machine 12. Of course, the metal oxide may not be agglomerated but mixed with the pulverized reductant. If agglomerated as pellets or unagglomerated, the mixture would be fed into a RHF 14 for at least partial metallization. The metal may be used as a feed material in a refining vessel. Depending upon the residual oxide, the metal may be fed into the vessel containing a molten bath such an electric arc furnace 16 (EAF) having an electrode 20 and/or a converter 18 such as an argon oxygen decarburizer (AOD) or a top and bottom blown refining reactor (TBRR). Each of the AOD and TBRR may be provided with a top blowing oxygen lance 22, bottom gas stirring tuyeres 23, an iron bath 28 and slag layer 30. When the metal is to be used as a feed material for an AOD or a TBRR, it may be desirable to include slagging agents in the pulverized mixture when the metal oxide is chromite ore in order to preheat the slagging agents in the RHF for the refining vessel. Acceptable slagging agents include $CaCO_3$, $CaO$, $MgO$, $Al_2O_3$, $SiO_2$ and $CaF_2$.

Figure 2:
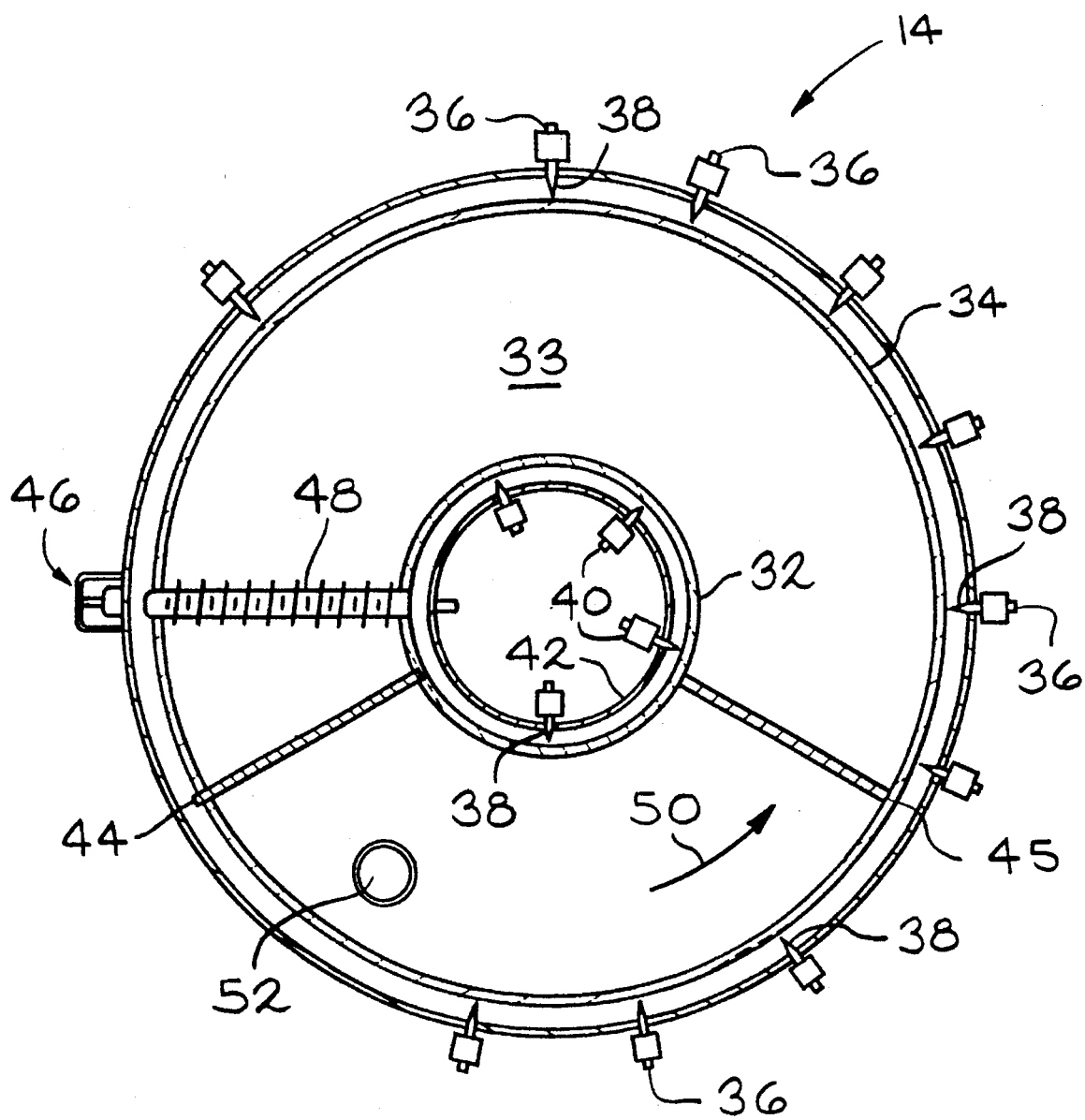
FIG. 2 is a schematic of a rotary hearth furnace used in the process of FIG. 1 of the invention.

FIG. 2 is an enlarged top view of RHF 14 of FIG. 1 of the invention. Furnace 14 includes an annular inner refractory wall 32, an annular outer refractory wall 34, an annular refractory platform 33 between the walls 32 and 34, a plurality of fuel burners 36 positioned on the periphery of the platform such as being mounted onto outer wall 34 with a nozzle 38 on each burner extending through openings in the wall at positions just above the upper surface of platform 33, fuel burners 40 on an annular frame 42 at positions inside platform 33, feeders 44 and 45, and means 46, such as a auger 48, for removing reduced metal oxide from platform 33. Platform 33 is rotated past the burners at a controlled speed in a direction indicated by arrow 50. Off-gases of combustion from the fuel and vaporization of any sulfur dissociated during reducing of the metal oxide accompanied with sulfur-bearing concentrate are evacuated through a vent 52. The residual energy of these off-gases can be reused in a heat recovery system (not shown) to preheat the fuel and air. Burners 36, 40 are positioned a distance above the upper surface of platform 33.

The RHF preferably includes several burners mounted to one of the annular walls of the furnace with the burners being aligned in a direction toward the upper surface of the platform so that radiation from the flames from the burners can transfer directly to the surface of the mixture of metal oxide and reductant deposited upon the upper surface of the platform. After the metal oxide mixture is placed thereon, the platform is rotated past the burners. Thus, the platform functions as a counter-flow heat exchanger but with the heat transfer mainly by radiation to the surface of the mixture and by conduction within the mixture layer. Unlike a shaft furnace wherein the heating gases travel upwardly through a column of ore, the gas flow in the RHF differs in that a thin layer of the metal oxide/reductant mixture to be reduced is rotated past an oxidizing flame where heat is transferred to the metal oxide primarily by radiation from the flame and from the inside wall of the furnace and by conduction within the mixture layer. That is, the metal oxide to be reduced rotates counter-current to the gas flame at a controlled speed. High temperatures are quickly reached because of the high surface area and thin depth, promoting fast reaction kinetics with the material needing only contact with the reductant and to be exposed to the flame for less than one hour to reduce the metal oxide. Inherent disadvantages associated with a vertical shaft furnace such as material sticking and strength problems are avoided with a RHF.

Since only a thin layer of the metal oxide lays on the rotating platform and does not have to support great burden mass as in the case of a vertical shaft furnace or undergoes impact as in a rotary kiln, the agglomerate need not have structural integrity. This is especially important when the metal oxide is pulverized, mixed with other materials, e.g., coal and sulfur-bearing nickel concentrates, and formed into pellets. Nickel and iron sulfides are completely melted by 1200° C. The presence of these sulfides with a chromite ore-containing pellet will not jeopardize operation of the RHF since pellet strength would not be an issue.

Feeder 44 can be used to deposit a mixture of metal ore and a carbonaceous reductant in a continuous first layer having a thin, controlled depth across the width of platform 33 with the layer having a uniform thickness. The thickness of the first layer should be no greater than 40 mm, preferably no greater than 35 mm and most preferably no greater than 30 mm. If metal oxide and reductant are pulverized and compacted into pellets having a diameter of about 10 mm, the compacts can be placed onto the platform two to three pellets deep, i.e., 25 mm. The thickness of the layer should be no greater than 40 mm because the time required to reach a uniform temperature within the mixture layer increases exponentially with thickness, necessitating much longer times for an equivalent degree of metallization. Meanwhile, heat must be continually supplied to make up for heat losses and to meet the heat requirements for the endothermic metallization reaction with carbon. After the first layer preferably has been heated to a temperature of at least 1000° C., more preferably 1200° C., a second continuous layer having a uniform thickness of carbonaceous reductant is deposited onto the first layer to a depth of no more than about 10 mm by feeder 45 across the width of platform 33. The second layer preferably should cover the first layer and have a minimum depth of at least 2 mm, preferably at least 3 mm. The second layer should have a depth of 2–3 mm to provide sufficient carbon to reduce any oxidizing gases, e.g., $CO_2$, $H_2O$, from the flame that reaches the vicinity of the upper surface of the mixture, but not so deep as to be thermally insulating. The carbonaceous reductant layer should not exceed about 10 mm to permit adequate heat transfer by conduction to the underlying mixture layer undergoing metallization. Preferably, the ratio of the depth of the second layer to the depth of the first layer should be controlled within the range of 0.05 to 0.3.

It may be desirable to include different type ores in the mixture, separately or in combination, for at least partial reduction in the RHF. In the case when the reduced metal is used as a feed stock for manufacturing nickel-containing stainless steel, the mixture can desirably include chromium oxide and sulfur-bearing nickel concentrate. If sulfur-bearing nickel concentrate is used, nickel and iron sulfides will start melting and the liquid sulfur will partially dissociate as gaseous sulfur into the furnace atmosphere well before reduction of the chromium oxide begins. The sulfides may begin melting when the temperature of the layers is as low as 640° C.

When nickel late rite is included in the mixture, chromite preferably is not added to the mixture because the RHF metal product must first be transferred to an EAF for melting and deslagging and the slag would contain a high level of chromium oxide, resulting in low Cr yields. The RHF partially reduced metal product would contain at least 1.0 wt. % Ni. The reaction products of heating nickel laterite ore or nickel laterite concentrate in an RHF are Ni, Fe, $Fe_3C$ and remaining oxides $MeO_y$, where y=1 for Me=Ni and y=1.05, 1.33 or 1.5 for Me =Fe.

EXAMPLE 1

The process for reducing a metal oxide now will be described. A chromium-containing ore and coal could be pulverized separately, mixed together into a powder and compacted into low-strength pellets. The dry mixture would contain about 74 wt. % chromite ore or concentrate, 25 wt. % fixed carbon, and 1 wt. % bentonite binder. By fixed carbon is meant the carbon remaining in coal after carbon contained in the volatile matter has been removed. The particle sizes of the chromite and coal should be between 200–325 mesh (44–74 μm). The mixture then is formed into pellets having a diameter of about 10 mm. The pellets should be laid completely across the width of the rotary platform as a first layer two to three pellets deep to a depth of about 25 mm. A second layer of granulated coal having a particle size within the range of 10–100 mesh (0.15–2.0 mm) should then be deposited onto the first layer to a depth of 3 mm after the first layer is heated to a temperature of 1200° C. The total depth of the two layers would be about 30 mm. The ratio of the depth of the second layer to the depth of the first layer would be about 0.1. For reducing chromite ore, the first layer preferably should be heated to a temperature of at least 1300° C., more preferably at least 1350° C. for at least 30 minutes to achieve at least 40% metallization of the oxygen-bound chromium in chromite to chromium metal and a chromium carbide and 70% metallization of oxygen-bound iron in chromite to Fe as iron and iron carbide. The first layer should not be heated to a temperature greater than 1450° C., however, because significant melting of the metallized product, e.g., carbide, causes the metallized layer to be difficult to be discharged from the rotary hearth platform. In this example, the mixture layer would be pre-heated by an oxidizing flame to a temperature of 1200° C. in 10–15 minutes. Thereafter, the coal layer is added to the upper surface of the hot metal oxide layer. The layers on the platform then would continue to be heated by radiation from the oxidizing flame for an additional 30 minutes during which time metallization of the first metal oxide layer would occur. After the metallization for 30 minutes, the mixture would be permitted to cool to about 200° C. or be discharged hot, e.g., 1000°–1300° C., from furnace 14 by auger 48, both under a protective atmosphere of inert gas. If discharged hot from the RHF, the partially metallized mixture would be charged into a refining vessel such as an AOD or TBRR.

The second carbonaceous layer protects the metallized chromium and iron in any zone of the mixture that is carbon-depleted from becoming reoxidized by the products of combustion of the oxidizing flame within the furnace. Whenever any of the oxidizing gases attempt to penetrate the second layer, the gases are regenerated into reducing gases, e.g., CO and $H_2$, by the carbon in the second layer. The partially reduced chromite consisting of Cr and Fe metal, Cr and Fe carbides, unreduced oxygen-bound Cr and Fe, and the stable oxides $SiO_2$, MgO, $Al_2O_3$ and CaO may be charged into iron bath 24 covered by a slag 26 in furnace 16 or an iron bath 28 covered by a slag 30 in refining vessel 18, thereby supplying inexpensive Cr units for making stainless steel.

EXAMPLE 2

The process for reducing another metal oxide now will be described. Low-sulfur nickel laterite ore contains about 1–3 wt. % NiO, 15–20 wt. % $Fe_2O_3$, 30—40 wt. % $SiO_2$, 15–30 wt. % MgO, up to 40 wt. % water tied up as (Fe,Ni)OOH] and small amounts of $Al_2O_3$ and $Cr_2O_3$. Laterite and coal could be pulverized into powders, mixed together and compacted into low strength pellets as described in Example 1. The dry mixture could contain 74 parts of laterite ore and 25 parts of fixed carbon and 1 part bentonite. The pellets could be laid completely across the width of the rotary platform as a first layer to a depth of 25 mm. After pre-heating the first layer of pellets to about 1200° C. by an oxidizing flame, granulated coal having a particle size within the range of 10 to 100 mesh could be deposited onto the first layer to a depth of 2–3 mm with the ratio of the depth of the second layer to the depth of the first layer being about 0.1. The pellets would continue to be heated to maintain the temperature of 1200° C. for an additional 30 minutes. Thereafter, the reduced nickel oxide pellets would be permitted to cool to 200° C. before discharged from the furnace or charged at temperature directly to an iron bath in an EAF for deslagging off the undesirable oxide constituents. In so doing, the reduced nickel ore pellets could be used to provide Ni and Fe units for making a nickel alloyed steel such as AISI 304 stainless steel.

EXAMPLE 3

In another example, a chromium oxide-containing dust from an EAF or AOD used for making stainless steel could be partially reduced in a RHF. Such a dust normally would have a particle size of −325 mesh and could contain 12–22 wt. % $Cr_2O_3$, 30–60 wt. % $Fe_2O_3$ and the balance essentially CaO, $SiO_2$, $Al_2O_3$ and MgO. The dust also could contain small amounts of heavy metals such as ZnO and PbO. The dust could be mixed with at least 15 wt. % fixed carbon from pulverized coal and some pulverized chromite, compacted into low strength pellets and deposited as a first layer to a depth of 25 mm similar to that described in Example 1. After pre-heating the layer to about 1200° C. by an oxidizing flame in about 10–15 minutes, granulated coal having a particle size within the range of 10 to 100 mesh would be deposited onto the first layer to a depth of 2–3 mm with the ratio of the depth of the second layer to the depth of the first layer being about 0.1. The pellets would continue to be heated to a temperature of 1350° C. and maintained at this temperature for an additional 30 minutes. Thereafter, the partially reduced mixture consisting of Cr and Fe metal, Cr and Fe carbides, any remaining unreduced oxygen-bound Cr and Fe, and stable oxides of $SiO_2$, MgO, $Al_2O_3$ and CaO would be permitted to cool to 200° C. or be discharged hot from the furnace at a temperature of 1000°–1300° C. both under a protective atmosphere of inert gas to an iron bath contained in an AOD or TBRR for smelting and refining, thereby capturing the valuable Cr units. Any excess carbon dissolves in the bath and would be removed by blowing oxygen in either of the AOD or TBRR refining vessels. Thus, a chromium oxide-containing steelmaking dust could be used for supplying inexpensive Cr and Fe units for making a stainless steel.

EXAMPLE 4

Another example will describe how a mixture of chromite ore and sulfur-bearing nickel concentrate could be processed in a RHF. Chromite ore, sulfur-bearing nickel concentrate and coal could be pulverized into powders, mixed together and then compacted into low strength pellets and be deposited as a first layer to a depth of 25 mm similar to that described in Example 1. After preheating the pellet layer to about 1200° C. by an oxidizing flame in about 10–15 minutes, granulated coal having a particle size within the range of 10 to 100 mesh would be deposited onto the first layer to a depth of 2–3 mm with the ratio of the depth of the second layer to the depth of the first layer being about 0.1. The pellets would continue to be heated up to a temperature of 1350° C. and maintained at this temperature for an additional 30 minutes. Partial desulfurization can occur by dissociation into gaseous sulfur to the RHF atmosphere. The gaseous sulfur will oxidize to sulfur dioxide as soon as it passes through the second layer into the oxidizing furnace atmosphere. The reaction products of heating the sulfur-bearing nickel concentrate and chromite ore in the RHF would be metallic Ni, unreacted nickel sulfide, Cr and Fe metal, Cr and Fe carbides and unreduced oxygen-bound Cr and Fe when the fixed carbon of the coal mixed with the sulfur-bearing nickel concentrate and chromite ore mixture at least equals 10 wt. % of the mixture. In this example, sulfur-bearing nickel concentrate and chromite ore could be desulfurized and partially reduced, respectively in a RHF and then charged into an iron bath contained in an AOD for smelting and refining the metallized chromite and accompanying Ni to provide Cr, Ni and Fe units for making a chromium nickel alloyed steel such as AISI 304, 12 SR and 18 SR stainless steels. Final smelting of oxygen-bound chromium would occur primarily by carbon, e.g., $(Fe,Cr)_3C$ and $(Cr, Fe)_7C_3$, and excess carbon, carried to and dissolved into the bath and, secondarily, by any other reductants dissolved in the bath such as silicon or aluminum. Any residual carbon remaining after this reduction period would be removed from the iron bath by blowing of oxygen through the lance. Remaining sulfur in the iron bath accompanying the metallized pellets would be removed by the refining slag covering the bath during the reduction period when an inert gas such as high purity argon, e.g., 99.998 vol. %, is injected through the tuyeres.

At the time of filing this patent application, the spot market cost per kg for chromium in the form of ferrochromium and nickel in the form of ferronickel or nickel shot was about $ 1.50 and $ 8 respectively. The cost per kg of chromium and nickel in the form of the feed stock produced in Examples 1–5 would be as little as about $ 1.20 and $ 6 respectively. An advantage of this invention is the potential realization of a cost savings of about $ 0.30 or more per kg for Cr feed material when making ferritic stainless steel and a cost savings of about $ 2 or more per kg for Cr and Ni feed material when making austenitic stainless steel.

It will be understood various modifications can be made to the invention without departing from the spirit and scope of it. Therefore, the limits of the invention should be determined from the appended claims.

What is claimed is:

1. A method of reducing metal oxide, comprising:
   providing a furnace having an annular platform and at least one fuel burner,
   placing a first layer of a mixture containing an oxygen-bound metal and a reductant onto an upper surface of the platform,
   rotating the platform past the burner to heat the first layer with an oxidizing flame,
   charging a second layer of the reductant covering the heated first layer,
   continue heating the layers to sufficient temperature and for sufficient time to form at least a partially reduced mixture, whereby the second layer prevents reoxidation of the partially reduced mixture within the furnace.

2. The method of claim 1 wherein the mixture is heated to at least 1000° C. before being covered with the second layer.

3. The method of claim 1 wherein the oxygen-bound metal is from the group consisting of chromite ore, laterite ore, garnierite ore, a concentrate produced from chromite ore and a stainless steel flue dust.

4. The method of claim 1 wherein the mixture is pulverized with the oxygen-bound metal and the reductant each having a grain size of at least –200 mesh, the powder mixture being compacted into pellets.

5. The method of claim 1 wherein the mixture contains at least 10 wt. % fixed carbon.

6. The method of claim 1 wherein the partially reduced mixture contains at least 5.0 wt. % chromium as metal or as a chromium carbide.

7. The method of claim 1 wherein the oxygen-bound metal is chromium and iron, the partially reduced mixture having at least 40% of the oxygen-bound chromium reduced to chromium or chromium carbide and at least 70% of the oxygen-bound iron reduced to iron or an iron carbide.

8. The method of claim 1 wherein the mixture contains chromite ore, a reductant and a slagging agent from the group consisting of $CaCO_3$, CaO, MgO, $Al_2O_3$, $SiO_2$ and $CaF_2$.

9. The method of claim 1 wherein the mixture contains chromite ore and sulfur-bearing nickel concentrate.

10. The method of claim 9 wherein the partially reduced mixture contains at least 5 wt. % chromium as metal or as a chromium carbide and at least 0.1 wt. % nickel as metal or as a nickel sulfide.

11. The method of claim 1 wherein the partially reduced mixture contains at least 1 wt. % nickel as metal.

12. The method of claim 1 wherein the mixture contains at least a stoichiometric amount of the reductant required to reduce theoretically all the oxygen-bound metal in the mixture.

13. The method of claim 1 wherein the first layer is no more than 40 mm deep.

14. The method of claim 1 wherein the second layer is no more than 10 mm deep.

15. The method of claim 1 wherein the ratio of the depth of the second layer to the depth of the first layer is at least 0.05.

16. The method of claim 1 wherein the ratio of the depth of the second layer to the depth of the first layer is 0.05–0.3.

17. The method of claim 2 wherein the mixture is heated to a temperature of at least 1300° C. and maintained at this temperature for at least 30 minutes.

18. The method of claim 1 wherein the oxygen-bound metal includes chromite ore and the additional steps of feeding the partially reduced mixture into an iron bath contained in a refining vessel, reducing oxygen-bound chromium to chromium or a chromium carbide and blowing oxygen into the iron bath to remove excess carbon to form a stainless steel.

19. A method of reducing metal oxide, comprising:

providing a furnace having an annular platform and at least one fuel burner, placing a first layer of a mixture containing an oxygen-bound metal and a reductant onto an upper surface of the platform, rotating the platform past the burner to heat the first layer with an oxidizing flame to a temperature of at least 1000° C., charging a second layer of the reductant covering the heated first layer, continue heating the layers for an additional 30 minutes to at least partially reduce the oxygen-bound metal, the partially reduced mixture contains at least 1% metal as metal or as a metal carbide, whereby the second layer prevents reoxidation of the metal within the furnace.

20. A method of reducing metal oxide, comprising:

providing a furnace having an annular platform and at least one fuel burner, placing a fast layer of a mixture containing a reductant and oxygen-bound chromium and iron onto an upper surface of the platform, rotating the platform past the burner to heat the first layer with an oxidizing flame to a temperature of at 1200° C., charging a second layer of the reductant covering the heated first layer, continue heating the layers to at least 1300° C. to partially reduce the oxygen-bound chromium and iron, the partially reduced mixture containing at least 40% chromium or a chromium carbide and at least 70% of iron or an iron carbide, whereby the second layer prevents reoxidation of the chromium or iron within the furnace, providing a refining vessel containing an iron bath, feeding the partially reduced mixture into the bath, refining the bath until the oxygen-bound chromium and oxygen-bound iron are reduced to chromium and iron thereby forming a stainless steel.

* * * * *